(12) United States Patent
Sun et al.

(10) Patent No.: US 7,576,755 B2
(45) Date of Patent: Aug. 18, 2009

(54) PICTURE COLLAGE SYSTEMS AND METHODS

(75) Inventors: Jian Sun, Beijing (CN); Xiaoou Tang, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 11/674,243

(22) Filed: Feb. 13, 2007

(65) Prior Publication Data

US 2008/0193048 A1    Aug. 14, 2008

(51) Int. Cl.
G09G 5/00    (2006.01)
(52) U.S. Cl. ........................ 345/629; 715/244
(58) Field of Classification Search .............. 715/243, 715/244
See application file for complete search history.

(56) References Cited

U.S. PATENT DOCUMENTS

| | | | |
|---|---|---|---|
| 6,123,362 A * | 9/2000 | Squilla et al. ............. | 283/67 |
| 6,282,317 B1 | 8/2001 | Luo et al. | |
| 6,411,742 B1 | 6/2002 | Peterson | |
| 6,597,802 B1 | 7/2003 | Bolle et al. | |
| 6,681,058 B1 | 1/2004 | Hanna et al. | |
| 2001/0034740 A1 | 10/2001 | Kerne | |
| 2003/0095720 A1 * | 5/2003 | Chiu et al. ................. | 382/284 |
| 2003/0223622 A1 | 12/2003 | Simon et al. | |
| 2004/0024758 A1 | 2/2004 | Iwasaki | |
| 2005/0044485 A1 * | 2/2005 | Mondry et al. ............ | 715/502 |
| 2006/0056737 A1 | 3/2006 | Ohtsuka et al. | |
| 2006/0104542 A1 * | 5/2006 | Blake et al. ............... | 382/284 |
| 2007/0098266 A1 * | 5/2007 | Chiu et al. ................. | 382/224 |
| 2007/0253028 A1 * | 11/2007 | Widdowson ............... | 358/1.18 |

FOREIGN PATENT DOCUMENTS

| | | |
|---|---|---|
| WO | WO2004029826 | 4/2004 |
| WO | WO2005059832 | 6/2005 |

OTHER PUBLICATIONS

Lee et al. "Random-Collage Model for Natural Images", IJCV_Oct99; Feb. 5, 2000.*
Melas et al., "Double Markov Random Fields and Bayesian Image Segmentation", IEEE Transactions on Signal Processing, vol. 50, No. 2, Feb. 2002.*

(Continued)

*Primary Examiner*—Kee M Tung
*Assistant Examiner*—Michelle K Lay
(74) *Attorney, Agent, or Firm*—Lee & Hayes, PLLC

(57) ABSTRACT

Systems and methods provide picture collage systems and methods. In one implementation, a system determines a salient region in each of multiple images and develops a Bayesian model to maximize visibility of the salient regions in a collage that overlaps the images. The Bayesian model can also minimize blank spaces in the collage and normalize the percentage of each salient region that can be visibly displayed in the collage. Images are placed with diversified rotational orientation to provide a natural artistic collage appearance. A Markov Chain Monte Carlo technique is applied to the parameters of the Bayesian model to obtain image placement, orientation, and layering. The MCMC technique can combine optimization proposals that include local, global, and pairwise samplings from a distribution of state variables.

20 Claims, 12 Drawing Sheets

OTHER PUBLICATIONS

Hanson et al., "Introduction to Bayesian image analysis", Medical Imaging: Image Processing, M.H. Loew, ed. Proc. SPIE 1893, 1993, pp. 716-731.*

Nicholls, Geoff K., "Bayesian image analysis with Markov chain Monte Carlo and coloured continuum triangulation models"), J.R. Statist. Soc. B (1998) 60, Part 3, pp. 643-659.*

Fan et al., "Automatic Image Annotation by Using Concept-Sensitive Salient Objects for Image Content Representation", SIGIR '04, ACM, 2004, pp. 361-368.

Rother et al., "Digital Tapestry", 8 pages.

Wang et al., "Grouping Web Image Search Result", MM '04, ACM, 2004, pp. 436-439.

* cited by examiner

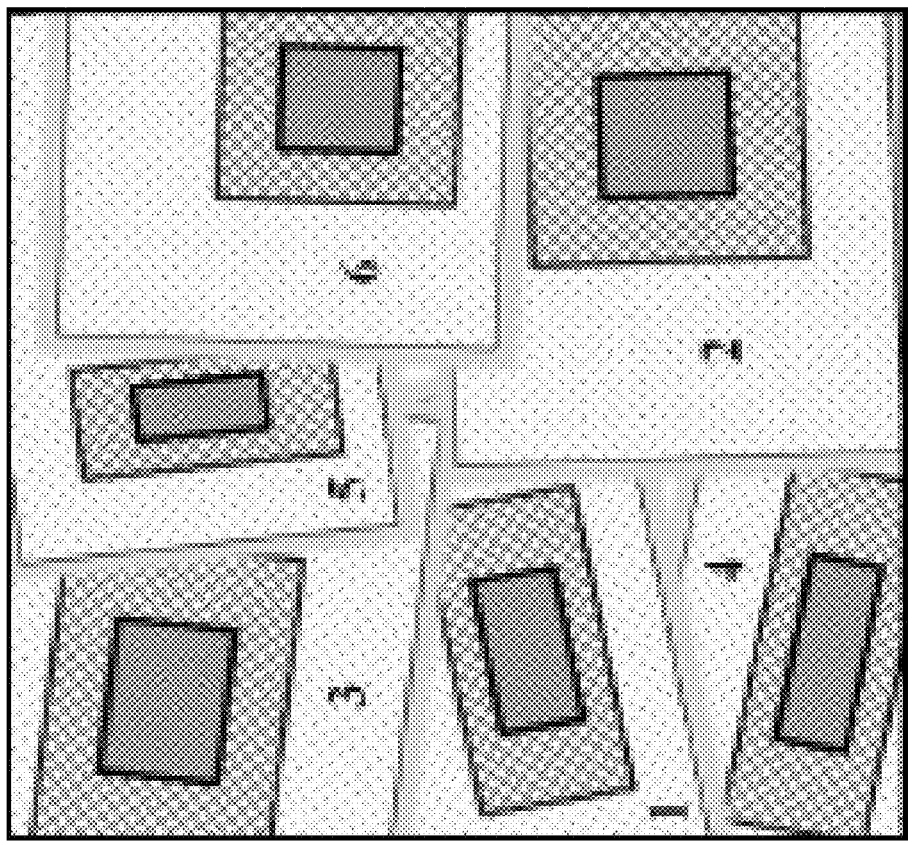
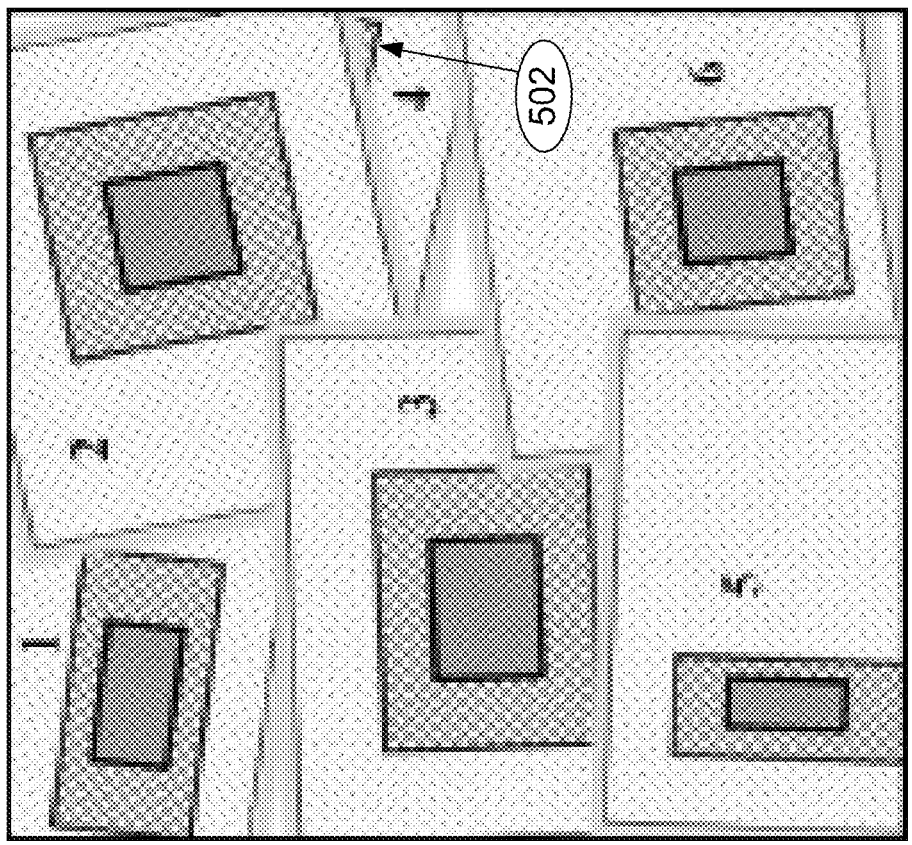
Fig. 5

Fig. 10

1200

```
┌─────────────────────────────────────────────────────────────┐
│ ARRANGE COLLAGE PARAMETERS FOR A SALIENCE VISIBILITY        │
│ MAXIMIZATION, A BLANK SPACE MINIMIZATION, AND A SALIENCE    │
│ VISIBILITY BALANCE IN A BAYESIAN NETWORK TO CREATE A        │
│ BAYESIAN MODEL OF A COLLAGE                                 │
│                          1202                                │
└─────────────────────────────────────────────────────────────┘
                              │
                              ▼
┌─────────────────────────────────────────────────────────────┐
│ OPTIMIZE THE COLLAGE PARAMETERS BY APPLYING A MARKOV CHAIN  │
│ MONTE CARLO (MCMC) TECHNIQUE TO THE BAYESIAN MODEL          │
│                          1204                                │
└─────────────────────────────────────────────────────────────┘
                              │
                              ▼
┌─────────────────────────────────────────────────────────────┐
│ WHEREIN THE MCMC TECHNIQUE SAMPLES COMBINATIONS OF STATE    │
│ VARIABLES FROM A DISTRIBUTION BY COMBINING A FIRST          │
│ OPTIMIZATION PROPOSAL BASED ON A LOCAL SEGMENT OF THE       │
│ DISTRIBUTION, A SECOND OPTIMIZATION PROPOSAL BASED GLOBALLY │
│ ON THE DISTRIBUTION, AND A THIRD OPTIMIZATION PROPOSAL      │
│ BASED ON A COMPROMISE BETWEEN THE FIRST AND SECOND          │
│ OPTIMIZATION PROPOSALS                                      │
│                          1206                                │
└─────────────────────────────────────────────────────────────┘
```

Fig. 12

PICTURE COLLAGE SYSTEMS AND METHODS

BACKGROUND

With digital image content growing exponentially due to a blossoming of digital photography and the power of the Internet, it becomes an increasing challenge to browse through voluminous image databases. Visually summarizing vacation photos in a home computer directory or images returned from an Internet search query poses a challenge. To make browsing these images more efficient and enjoyable, various conventional image summarization techniques try to address this challenge. Most of these conventional techniques rely on content-based methods such as image clustering and categorization to provide a high-level description of a set of images.

One simple conventional technique for image arrangement is page layout, which aims to maximize page coverage without image overlap. However, both page layout techniques and image mosaic techniques share a similar drawback—they waste display area by showing parts of an image that are not important.

An interactive approach for combining multiple images is interactive digital photomontage. The user manually specifies salient regions of importance or focus on each image and this conventional technique creates a single composite image. The technique works well only when all input images are roughly aligned. But in most practical situations, images are usually considerably different from each other and not aligned.

Digital tapestry is another conventional technique that formulates the selection of salient regions and their placement together as a Markov Random Field (MRF) problem. However, artifacts are introduced along the boundaries of two neighboring salient regions of two different images in the digital tapestry. Although artifact removal methods might be used to correct this flaw, there are still obvious artifacts, which make the final tapestry unnatural or unrealistic.

SUMMARY

Systems and methods provide picture collage systems and methods. In one implementation, a system determines a salient region in each of multiple images and develops a Bayesian model to maximize visibility of the salient regions in a collage that overlaps the images. The Bayesian model can also minimize blank spaces in the collage and normalize the percentage of each salient region that can be visibly displayed in the collage. Images are placed with diversified rotational orientation to provide a natural artistic collage appearance. A Markov Chain Monte Carlo technique is applied to optimize the parameters of the Bayesian model to obtain image placement, orientation, and layering. The MCMC technique can combine optimization proposals that include local, global, and pairwise samplings from a distribution of state variables.

This summary is provided to introduce exemplary picture collage systems and methods, which are further described below in the Detailed Description. This summary is not intended to identify essential features of the claimed subject matter, nor is it intended for use in determining the scope of the claimed subject matter.

BRIEF DESCRIPTION OF THE DRAWINGS

FIG. 5 is a diagram of exemplary saliency ratio balancing.

FIG. 10 is a diagram of exemplary collages produced from a relatively large number of images using exemplary parallel sampling.

FIG. 12 is a flow diagram of an exemplary method of modeling and optimizing a picture collage.

DETAILED DESCRIPTION

Overview

Described herein are systems and methods for combining multiple images into a picture collage to be displayed as a single digital image. In one implementation, an exemplary system generates a collage that displays as many visible salient regions as possible (without being overlaid by other images) from the images in a collection. "Salient region" describes the relevant part of an image that is the main focus of a typical viewer's attention. An exemplary picture collage system provides an overlay style, which is desirable in artistic collages, e.g., painted or assembled from paper photos or other artistic media by an artist.

In one implementation of an exemplary picture collage system, the salient region of each input image is automatically computed based on image content (color, texture, and orientation). Then, collage parameters are modeled in a Bayesian framework that aims to maximize the visible salient region of each image, to minimize blank spaces in the collage, and to balance the salient regions so that a similar percentage of each photo's salient region is displayed in the collage. The orientation (i.e., rotation) of each photo in the collage is diversified within bounds to provide a natural random appearance that is characteristic of conventional art collages. An efficient Markov Chain Monte Carlo (MCMC) optimization technique is applied to the Bayesian model to generate (infer) a particular collage.

Thus, an exemplary picture collage system models a collection of digital images in a Bayesian picture collage framework to automatically create a visual image summarization for a set of images. The exemplary picture collage system can be used in many different ways. For example, an exemplary picture collage can be used to efficiently view a collection of digital photos, or may be used to summarize Internet search results in a single page, when the search results involve images. In one implementation, the user selects an image in the collage to retrieve the associated original image from a collection of images or clicks to link to the associated website from which an individual image was obtained.

Exemplary System

Figure 1:
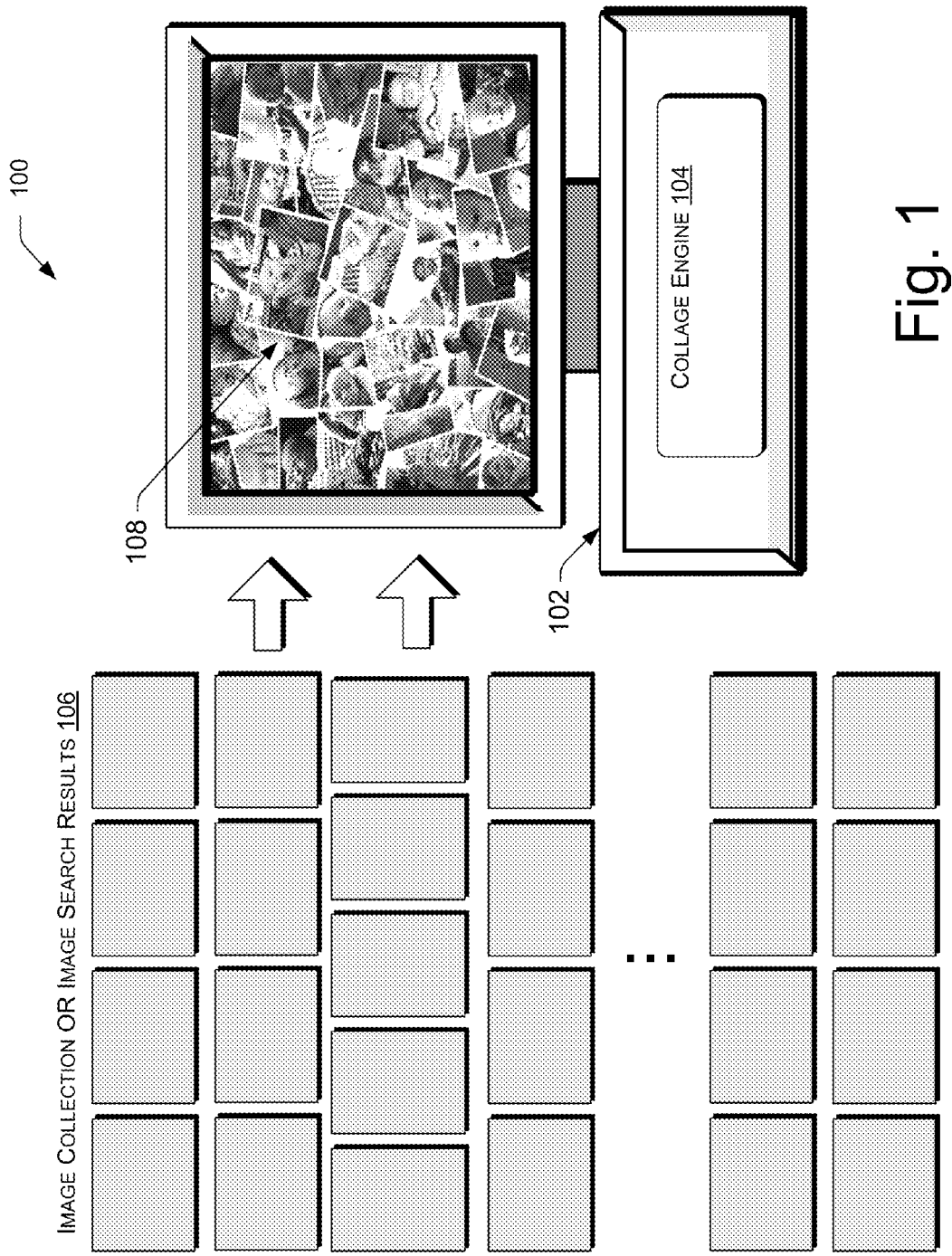
FIG. 1 is a diagram of an exemplary picture collage system.

FIG. 1 shows an exemplary picture collage system 100. A computing device 102 hosts an exemplary collage engine 104. The collage engine 104 receives data representing a digital image collection or image search results 106. The collage engine 104 models the image collection or search results 106 in a Bayesian framework and applies a Markov Chain Monte Carlo (MCMC) technique to create an exemplary picture collage 108 in which the salient region of each image is displayed in an overlay style and balanced with the salient regions of the other images in the collage. Blank space is minimized in the exemplary collage 108 and the (rotational) orientation of each image is diversified in a manner that is pleasing to the human observer.

Exemplary Engine

Figure 2:
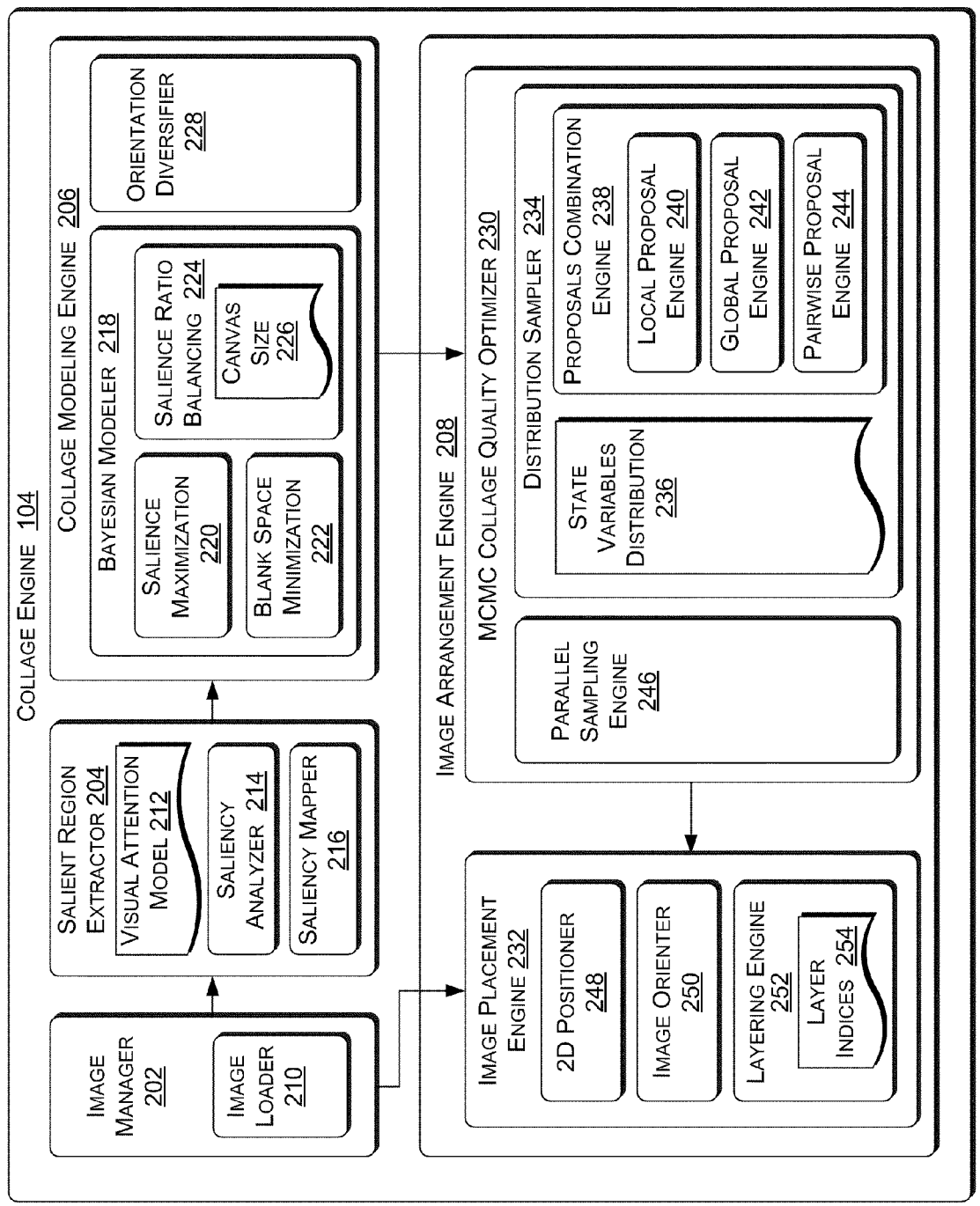
FIG. 2 is a block diagram of an exemplary collage engine.

FIG. 2 shows an implementation of the exemplary collage engine 104 of FIG. 1, in greater detail. The illustrated implementation is only one example configuration of components, for descriptive purposes. Many other implementations of the exemplary collage engine 104 are possible within the scope of the subject matter. The illustrated exemplary collage engine 104 can be executed in hardware, or combinations of hardware, software, firmware, etc.

The exemplary collage engine 104 performs quick collage creation via sampling iterations (for example, 1000 iterations in eight seconds on a typical desktop computer). The exemplary collage engine 104 includes an image manager 202, a salient region extractor 204, a collage modeling engine 206, and an image arrangement engine 208. The image manager 202 keeps track of the collection of individual images that will be used to create the exemplary collage 108. The salient region extractor 204 determines the most important—salient—parts of each image. The collage modeling engine 206 formulates the goals of the potential collage to be created—e.g., to achieve a balanced display of the salient parts of each image within the confines of the canvas size—in a Bayesian framework. The image arrangement engine 208 finds an optimization of the Bayesian model provided by the collage modeling engine 206, and arranges the images onscreen accordingly.

In greater detail, the image manager 202 may include an image loader 210. The salient region extractor 204 includes a visual attention model 212 on which is based the determination of salient regions; and also includes a saliency analyzer 214 and a saliency mapper 216.

The collage modeling engine 206 includes a Bayesian modeler 218, which aims to provide a model interrelating a salience maximization 220, a blank space minimization 222, and a salience ratio balancing 224 that is based on canvas size 226. The collage modeling engine 206 also includes an image orientation diversifier 228.

The image arrangement engine 208 includes a Markov Chain Monte Carlo (MCMC) collage quality optimizer ("MCMC optimizer") 230 to infer collage parameters that optimize the features modeled by the Bayesian modeler 218. The image arrangement engine 208 also includes an image placement engine 232 to situate the individual images tracked by the image manager 202 onscreen according to the optimization provided by the MCMC collage quality optimizer 230, thereby creating the exemplary collage 108.

The MCMC optimizer 230 may further include a distribution sampler 234 to evaluate various proposals for optimizing collage state variables via sampling a state variables distribution 236. Likewise, a proposals combination engine 238 considers the state variables distribution 236 from different vantage points, in order to avoid adopting local minima or maxima as an optimization when a more comprehensive and diversified view reveals a better, more ideal optimization. The proposals combination engine 238 may include a local proposal engine 240, a global proposal engine 242, and a pairwise proposal engine 244. The MCMC optimizer 230 may also include a parallel sampling engine 246 to subdivide the onscreen canvas when there are numerous images past a threshold to be fit into the exemplary collage 108. For example, the parallel sampling engine 246 may divide the canvas into two halves when there are approximately 18-20 images, or into quarters when there are approximately 36-72 images, etc. The subdivided collage can then be combined into a single final collage 108.

The image placement engine 232 acts on the optimized parameters achieved by the MCMC optimizer 230 to make the collage 108 and therefore includes a 2D positioner 248 to post each of the original images in a particular location on the 2-dimensional onscreen canvas of a display, an image orienter 250 to determine the degree of rotation of each image, e.g., about its center point to achieve a collage appearance; and a layering engine 252 to place each image according to layer indices 254 in a visually overlaid "stack." When the images overlap each other, the layering engine 252 determines which image has priority to occlude other image(s).

Thus, the exemplary collage engine 104 receives a collection of images 106 as input and then outputs an exemplary picture collage 108 as a single image that maximizes display of the salient parts of the images in the collection 106.

Operation of the Engine and Detail of Exemplary Collage Techniques

Figure 3:
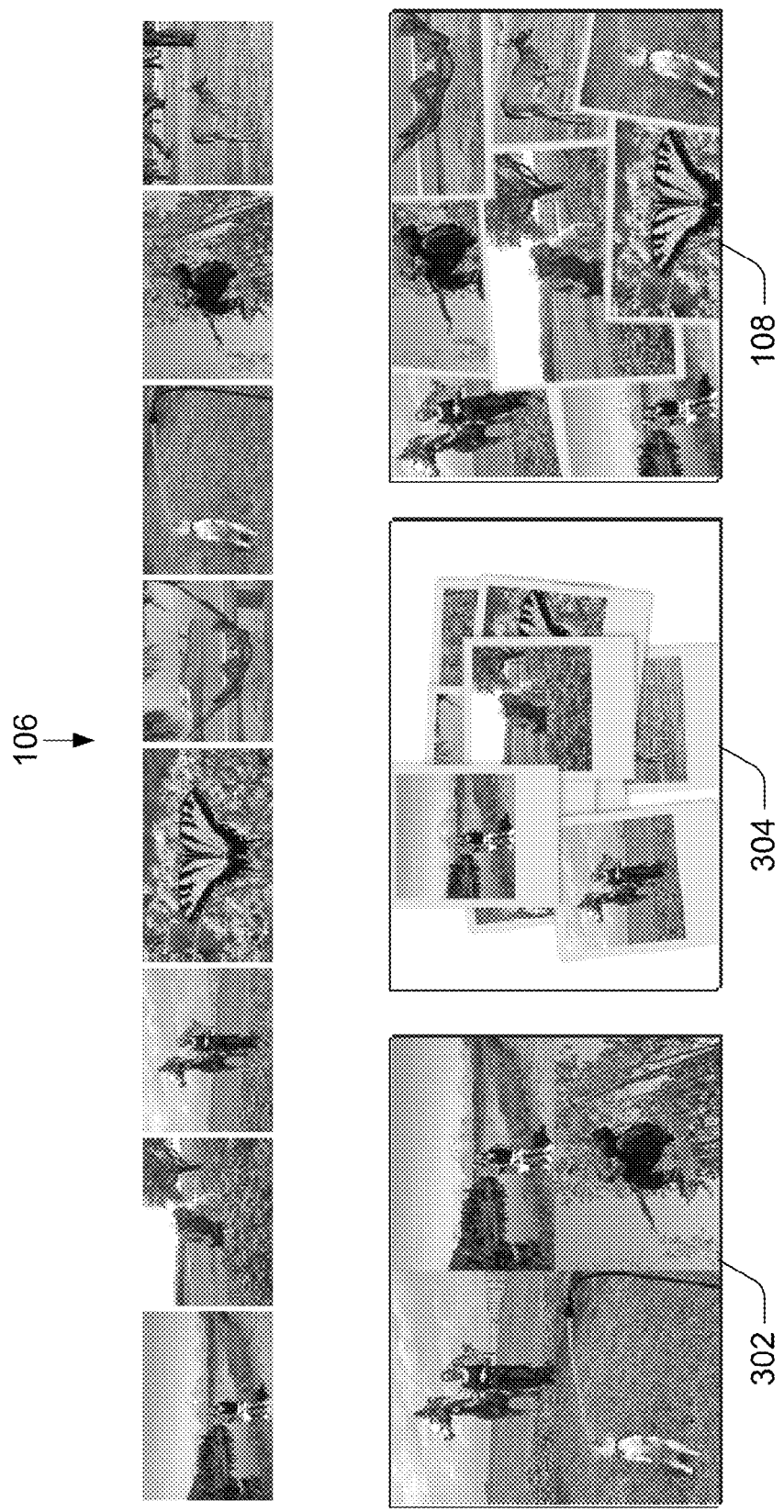
FIG. 3 is diagram of an exemplary picture collage in comparison with conventional image summarization techniques.

FIG. 3 compares an exemplary collage 108 with conventional image summarization techniques. The top row of FIG. 3 shows a collection of individual images 106 used to create a conventional image mosaic 302, a conventional collage 304, and the exemplary picture collage 108.

A common conventional summarization technique selects a smaller number of representative images than the entire image collection 106 and creates the conventional image mosaic 302. The disadvantage of this conventional approach is that the image mosaic 302 contains many uninformative regions (such as sky and grass in mosaic 302) at the expense of not including more images from the image collection 106. An ideal image summary should contain as many informative regions as possible on a given canvas space.

The conventional collage 304 is the product of typical commercial image browsing software. Images are randomly placed on a canvas allowing haphazard overlay. Although all images are displayed, more than half of the images are occluded beyond practical use. Additionally, each image in the conventional collage 304 is downsampled, and cropped without considering image content.

Compared with the conventional image mosaic 302 and the conventional collage 304, the exemplary picture collage 108 shows the most informative regions of all images in the collection 106 on a single canvas without downsampling and cropping. The exemplary collage engine 104 creates a visual image summarization of a group of images while maximizing visibility of the most relevant visual information.

An exemplary collage 108 thus has the following properties. First, with respect to salience maximization 220, a picture collage 108 should show as many salient regions (without being overlaid by others) as possible. Second, with respect to blank space minimization 222, the picture collage 108 should make the best use of the canvas. Third, with respect to salience ratio balancing 224, each image in the collage 108 should have a similar salience ratio (the percentage of visible salient region that can be shown, given the canvas size 226). Fourth, the orientations of the images in the collage 108 should be diverse, within bounds, so that the collage 108 emulates a desirable collage style created by human artists.

Creating the exemplary picture collage 108 is a more challenging task than creating conventional image summarizations, i.e., because of the complexity added by determining a layering order for overlapping the images. To handle the complexity, the MCMC collage quality optimizer 230 is used for finding the optimal balance between desired goals. To effectively and efficiently explore the Bayesian posterior probabilities, the proposals combination engine 238 can combine a mixture of three well-designed proposals, the local proposal 240, global proposal 242, and pairwise proposal 244. Experimental results show that the exemplary optimization approach is very efficient.

Exemplary Collage Formulation

Given N input images $\{I_i\}_{i=1}^N$ and their saliency maps $\{a_i\}_{i=1}^N$ (saliency map representation will be discussed below), the exemplary collage engine 104 arranges the input images on a canvas C. These inputs are denoted as observation $z=\{\{I_i\}_{i=1}^N, \{a_i\}_{i=1}^N, C\}$. In a picture collage 108, each image $I_i$ has a set of state variables $x_i=\{s_i, o_i, l_i\}$, where $s_i$ is the 2-dimensional spatial coordinate of the center of image $I_i$ in C, and $o_i$ is the orientation angle. Each image has a unique layer index $l_i \square \{1, 2, \ldots, N\}$ such that the placement order of all the images can be determined.

To incorporate several desired properties, such as salience maximization 220, blank space minimization 222, salience ratio balancing 224, and orientation diversity 228 as mentioned above, the modeler 218 formulates the potential picture collage 108 in a Bayesian framework, i.e., infers the Maximum a Posteriori (MAP) solution of the state variables $x=\{x_i\}_{i=1}^N$, given the observation z:

$$x^* = \underset{x}{\operatorname{argmax}}\ p(z|x)p(x), \qquad (1)$$

where p(z|x) is the likelihood model and p(x) is the prior model.

Saliency Representation

To begin creating the exemplary photo collage 108, the salient region extractor 204 determines salient regions (foci of viewers' attention) from the input images 106. In one implementation, the salient region extractor 204 extracts the largest salient region associated with each input image by adopting a visual attention model 212, which combines multi-scale image features (color, texture, orientation) in a discriminative framework that the saliency analyzer 214 processes.

Figure 4:
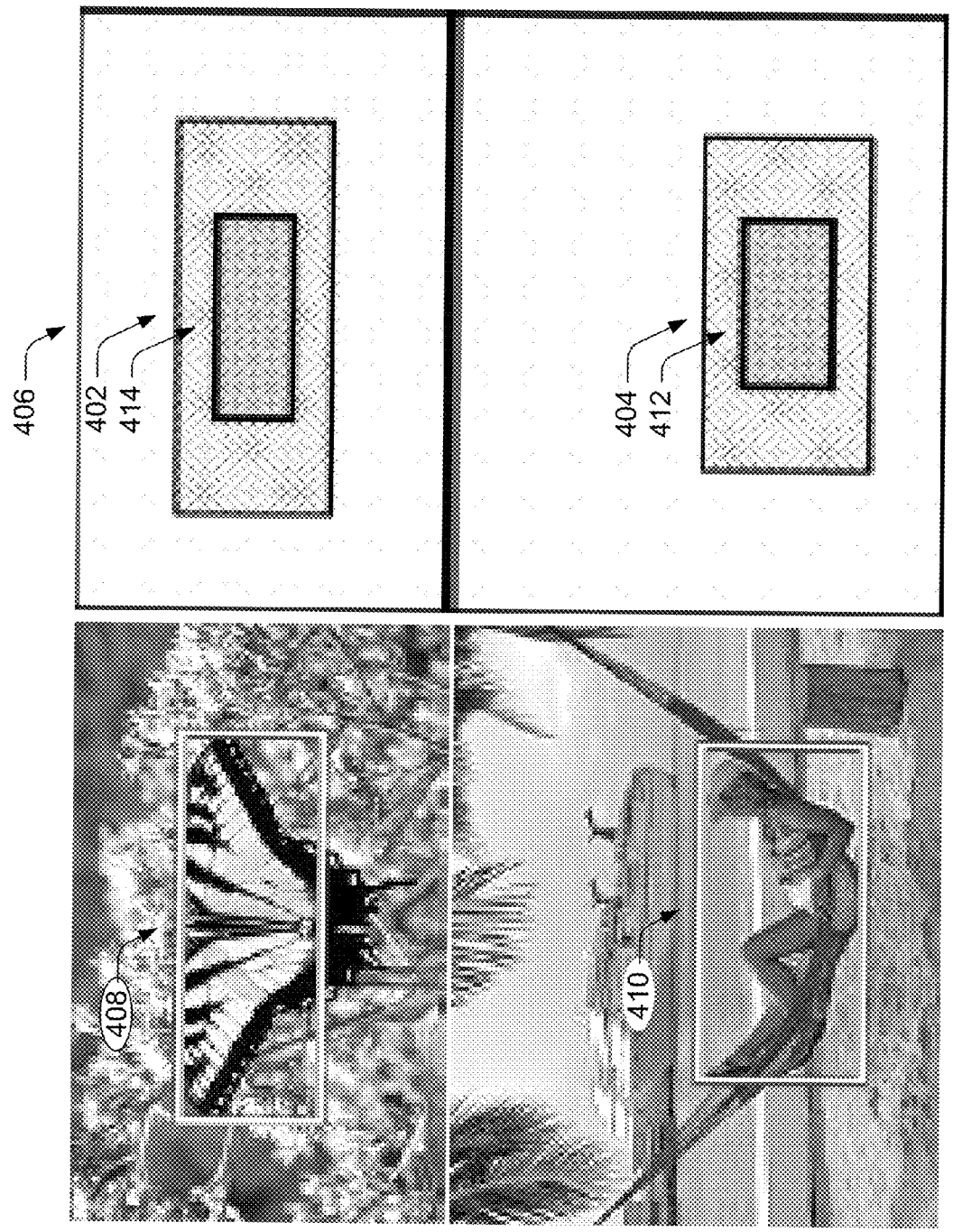
FIG. 4 is a diagram of exemplary salient region determination.

The saliency mapper 216 then obtains a map approximated by several weighted rectangles, as shown in FIG. 4. The inscribed rectangles 402 & 404 in the right column 406 are used to approximate the salient regions 408 & 410 in the left column 410. The innermost rectangles 412 & 414 have the largest saliency density. In some implementations, a conventional saliency determination algorithm may be employed. Where the saliency map is represented using a combination of several rectangles, such as two rectangles in FIG. 4, each rectangle has a homogeneous saliency density. With this approximated representation, the likelihood evaluation can be efficiently performed by simple polygon Boolean operations. For example, a fast implementation may be obtained from http://wwwv.cs.man.ac.uk/toby/alan/software/gpc.html.

Likelihood Determination

Likelihood measures the quality of an exemplary picture collage 108 given state variables x. The likelihood is modeled as an exponential distribution as in Equation (2):

$$p(z|x) = \frac{1}{Z}\exp(-(\overline{A}_{occ} + \lambda_B \overline{B} + \lambda_V V)). \qquad (2)$$

where Z is a normalization constant, $\overline{A}_{occ}$ is the normalized sum of occluded saliency regions, $\overline{B}$ is the normalized sum of uncovered regions on the canvas, and V is the variance of saliency ratios. Three terms encode salience maximization, blank space minimization, and salience ratio balance of a picture collage 108.

Salience Maximization

The salience term is used to maximize the total amount of visible saliency $A_{vis} = \Sigma_i a_i^{vis}$, where $a_i^{vis}$ is the visible part of the saliency region $a_i$. This is equivalent to minimizing the sum of occluded saliency regions $\overline{A}_{occ} = A_{max} - A_{vis}$, where $A_{max} = \Sigma_i a_i$. In one implementation, this measure is further normalized into the range [0, 1] via Equation (3):

$$\overline{A}_{occ} = A_{occ}/A_{max} \qquad (3)$$

Blank Space Minimization

Blank space is the space in the canvas which is not covered by any image. Thus, the blank space is the difference of the canvas bounding rectangle $R_C$ from the union of all the images: $B = R_C - Y_{i=1}^N$, where $R_i$ is the bounding rectangle of image $I_i$. B should be minimized to make the best use of canvas space. The normalized term in Equation (4) is also normalized:

$$\overline{B} = \text{Area}(B)/\text{Area}(R_C) \qquad (4)$$

Saliency Ratio Balancing

Due to the limitation of the canvas size, 226, the visible part of a saliency region may be very small as shown by saliency region 502 in image "4" of FIG. 5a. Without saliency ratio balancing 224 some images may be heavily occluded by the overlapping of other images. To avoid such a result, a visible saliency ratio balance can be introduced to obtain a well-balanced collage as shown in FIG. 5b. The visible saliency ratio of one image is calculated as $r_i = a_i^{vis}/a_i$. The variance of all saliency ratios shown in Equation (5)

$$V = \frac{1}{N}\sum_{i=1}^N (r_i - \bar{r})^2 \qquad (5)$$

is used to evaluate the balance, where $$\bar{r} = \frac{\sum_{i=1}^N r_i}{N}.$$

A more well-balanced picture collage 108 should have a smaller variance V.

In one implementation, to balance the relative importance of the above three factors, the weights $\lambda_B$ and $\lambda_V$ in Equation (2) above are set at the values 0.1 and 0.2.

Modeling the Bayesian Prior

The prior p(x) in Equation (1) above can be factorized as in Equation (6):

$$p(x) = p(x_s)p(x_o)p(x_l) \qquad (6)$$

where $x_s=\{s_i\}_{i=1}^N$, $x_o=\{o_i\}_{i=1}^N$, and $x_l=\{l_i\}_{i=1}^N$. To avoid introducing any bias, the position prior $p(x_s)$ is modeled as a uniform distribution over the canvas.

The orientation diversifier 228 globally measures the variety of rotational orientations of all images in the image collection 106 by computing the average of the absolute orientation differences between any two images $I_i$ and $I_j$, as in Equation (7):

$$o_g = \sqrt{\frac{\sum_{i=1,j=1}^{N}|o_i - _j|^2}{N(N-1)}}. \tag{7}$$

To encourage orientation diversity, $p(x_o)$ can be modeled as in Equation (8):

$$p(x_o) \alpha N(o_g; m_g, \sigma_g^2) \prod_i N(o_i; 0, \sigma_o^2), \tag{8}$$

where $\{m_g, \sigma_g\}$ controls the global diversity of orientations. The second term $N(o_i; 0, \sigma_o)$ encourages each image to be placed upright, whereas the variance $\sigma_o$ controls the individual diversity.

In order to assign a unique layer index 254 to each image, $p(x_l)$ can be modeled as in Equation (9):

$$p(x_l = l_1, \ldots, l_N) = \frac{\prod_i \prod_{j \neq i} \delta(l_i, l_j)}{n!}, \tag{9}$$

where $\delta(l_i, l_j)=1$ if $l_i \neq l_j$, and otherwise $\delta(l_i, l_j)=0$.

Exempla Collage Optimization

In one implementation, the objective modeling function is the combination of Equations (2) and (6). The resulting function is a high-dimensional, non-convex combinatorial optimization problem that is difficult to effectively solve. The Markov Chain Monte Carlo (MCMC) collage quality optimizer 230, however, can perform the optimization since the posterior can be evaluated with low computational cost, using the exemplary approximated saliency representation.

Exemplary Markov Chain Monte Carlo (MCMC) Techniques

Given a distribution $\pi(x)$ of variables x, in this case $\pi(x)=p(x|z)$, the MCMC optimizer 230 employs a strategy for generating samples $\{x^k\}_{k=1}^K$ of $\pi(x)$ by exploring the state space of x using a Markov Chain mechanism. This mechanism constructs a chain which spends more time in the regions with higher probability density. The stationary distribution of the chain will be the target distribution $\pi(x)$. In one implementation, the sample $$x^{k*} = \underset{x^k}{\mathrm{argmax}}\, p(x^k | z)$$

is selected as the MAP solution.

Most MCMC methods are based on the Metropolis-Hastings (MH) algorithm. In MH sampling, the proposal function $q(x|x^k)$ (also called transition kernel) can be an arbitrary distribution which is used to sample a candidate sample x given the current state x. This proposal function is the key factor that affects sampling efficiency. In other words, whether or not using a MCMC approach can effectively sample the target distribution $\pi(x)$ mainly depends on how well the proposal function $q(x|x^k)$ is designed.

Exemplary Optimization Proposals Design

There are many local minima or optima, in the exemplary high dimensional, non-convex combinatorial optimization problem. To avoid sticking at local minima, the distribution sampler 234 can employ a mixture of proposals to deal with this difficulty. The local proposal engine 240 obtains a local proposal $q_l$ that discovers finer details of the target distribution. The global proposal engine 242 obtains a global proposal $q_g$ that can explore vast regions of the state space of x, and a pairwise proposal engine 244 obtains a pairwise proposal $q_p$ that represents behavior in-between local and global.

The proposals combination engine 238 may define the mixture of proposal $q(x|x^k)$ as in Equation (10):

$$q(x^*|x^k)=v_l q_l(x^*|x^k)+v_g q_g(x^*|x^k)+v_p q_p(x^*|x^k), \tag{10}$$

where $v_l$, $v_g$ and $v_p$ are three weights with $v_l+v_g+v_p=1$, and these can be dynamically adjusted. Both global and pairwise proposals are critical to make the MCMC collage quality optimizer 230 jump out from a local minimum in the state variables distribution 236.

For clarity, let $\pi(x_i, \_)\equiv\pi(x_i, x\backslash x_i)$ when only the state $x_i$ is involved for update. Similarly, $\pi(s_i, \_)\equiv\pi(s_i, x\backslash s_i)$ when only the position of image $I_i$ is involved.

Exemplary Local Proposal Engine

A local proposal only changes the state of one image, once. The local proposal engine 240 calculates a proposal $q_l(x^*|x^k)$ to determine in a probabilistic manner which image is to be selected for update and how to propose an optimized state for the selected image. The local proposal engine 240 generates three proposals—for the position, orientation, and layer index: $x_s$, $x_o$, and $x_l$, respectively.

For the first issue, the local proposal engine 240 computes a weight $w_i$ for each image. This weight is inversely proportional to the visible saliency ratio $r_i=a_i^{vis}/a_i$ as given in Equation (11):

$$w_i = \frac{(r_i + \varepsilon)^{-1}}{\sum_l (r_i + \varepsilon)^{-1}}, \tag{11}$$

where $\epsilon=0.2$, for example, is a constant to dilute the influence of this weighting. The image $I_i$ is selected with the probability $w_i$.

For the second issue, a frequently-used method is Random walk sampling, i.e., adding a random disturbance to the current state configuration. However, in Random walk sampling, it often happens that a small step-size in the proposal results in exceedingly slow movement of the corresponding Markov Chain, whereas a large step-size results in a very low acceptance rate. In one implementation, to avoid such "blind" sampling, the local proposal engine 240 uses the following sampling technique to make large step-sizes without lowering the acceptance ratio based on a Multipoint Metropolis method.

To update the state $x_i=\{s_i, o_i, l_i\}$, the local proposal engine 240 randomly selects one of following proposals: a position proposal, an orientation proposal, or a layer proposal.

Position Proposal—Local View

The position proposal is based on Random-Grid Sampling (RGS):

Randomly generate a direction e and a grid size r;
Construct the candidate set as $y_m=s_i^k+m\cdot r\cdot e$, m=1, ..., M
Draw y from $\{y_m\}_{m=1}^M$ with probability $\pi(y_m)$ Construct the reference set $\{y_m^r = y - m \cdot r \cdot e\}_{m=1}^{M}$;
Let $s_i^{k+1} = y$ with probability $$\min\left\{1, \sum_{m=1}^{M} \pi(y_m) \Big/ \sum_{m=1}^{M} \pi(y_m^r)\right\}$$

or otherwise reject.

Conceptually, RGS performs a 1-dimensional probabilistic search on a random direction such that it can make a large step-size jump from the current state. However, the random sampling of the direction in RGS is still blind. Therefore, the local proposal engine 240 may propose a more effective direction e using either blank space-driven RGS or moveable direction-driven RGS.

Figure 6:
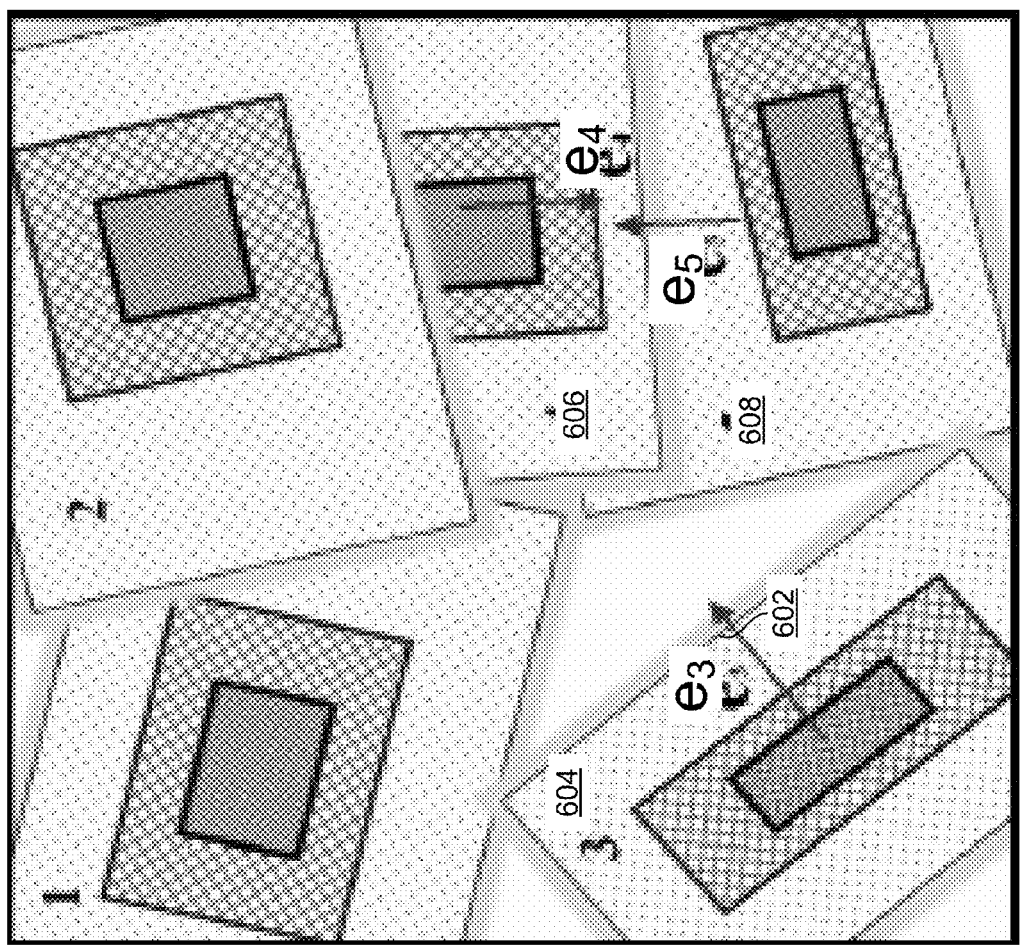
FIG. 6 is a diagram of exemplary blank space minimization.

In blank space-driven RGS, given a current state configuration, there may be a number of blank regions. In the case that there is at least one adjacent blank region $B_i$ for the image $I_i$ (one is randomly selected if there are more than one adjacent blank region), the local proposal engine 240 obtains a direction $e_i^B$ from the center of bounding rectangle $R_i$ to the center of the union region $R_i$ Y $B_i$. One such direction $e_3$ of image "3" 604 is shown in FIG. 6. Then the engine 240 samples e and r for RGS from two Gaussian distributions $N(e; e_i^B, \sigma_e^2)$ and $N(r; m_r, \sigma_r^2)$, respectively.

This type of proposal is particularly useful in the early phase of the sampling when there are many blank regions. In one implementation, M=10 in RGS.

In moveable direction-driven RGS, when there is no adjacent blank region for the image $I_i$, the directions $\{e_j\}_{j=1}^n$ from the image's center to the centers of its n adjacent images $\{I_j\}_{j=1}^n$ are considered. First, $R_i^a$ is denoted as the bounding rectangle of the saliency region in image $I_i$. Second, a "moveable" distance $d_{ij}$ is defined between images $I_i$ to its neighbor $I_j$. If the image $I_i$ is above image $I_j$, the "moveable" distance $d_{ij}$ is the minimal distance between the bounding rectangle $R^i$ of the image $I_i$ and the saliency bounding rectangle $R_j^a$ of the image $I_j$ (e.g., from image "4" 606 to image "5" 608 in FIG. 4). Otherwise, $d_{ij}$ is the minimal distance between $R_i^a$ and $R_j$ (e.g., from image "5" 608 to image "4" 606 in FIG. 6). Lastly, a direction $e_i^M$ is sampled from the direction set $\{e_j\}_{j=1}^n$ with a probability that is proportional to $\{d_{ij}\}_{j=1}^n$. The final direction e for RGS is again sampled from a Gaussian direction $N(e; e_i^M, \sigma_e^2)$. In case all the distances $d_{ij}$ are zero, a random direction is sampled. This proposal is very useful in the whole sampling phase.

Orientation Proposal—Local View

The RGS method can be directly applied for an orientation proposal because the orientation $o_i$ is a 1-dimensional variable. Direction sampling is not necessary. A grid size r can be sampled from a Gaussian distribution $N(r; m_o, \sigma_a^2)$. In one implementation, M is again set to the value 10.

Layer Proposal—Local View

For a layer proposal, to sample layer index $l^{k+1}$, the previous layer index $l^k$ is not considered because the layer change often causes a large change in the likelihood. Therefore, the layer index 254 can be generated using Multiple-Try Metropolised Independence Sampling (MTMIS). In one implementation, a basic process followed is:

Uniformly draw a trail set of layer index samples $\{y_m\}_{m=1}^M$ for the set $[1, 2, \ldots, N]$. Compute $W = \Sigma_{m=1}^M \pi(y_m, *)$;

Draw a layer index y from the trail set $\{y_m\}_{m=1}^M$ with probability proportional to $\pi(y_m, *)$;
Let $l^{k+1} = y$ with probability $$\min\left\{1, \frac{W}{W - \pi(y, *) + \pi(l^k, *)}\right\}$$

or otherwise let $l^{k+1} = l^k$.

In one implementation, M=2N so that there is a good chance to search a better layer index 254 in a probabilistic manner. Another significant advantage of using multiple-try sampling is that $\{\pi(l_i=1, *), \ldots, \pi(l_i=N, *)\}$ can be incrementally computed in a top-down manner such that the computation cost of multiple-try sampling is just twice the cost of a Random walk sampling.

Exemplary Global Proposal Engine

The exemplary global proposal engine 242 also generates three proposals, for the position, orientation, and layer index: $x_s$, $x_o$, and $x_l$.

Position Proposal—Global View

To make the new sample $x_s^{k+1}$ jump far way from a local minimum, the global proposal engine 242 samples the positions for all images independent of the current state $x_s^k$.

Roughly speaking, all images in an exemplary picture collage 108 should be well separated on the canvas, as shown by collage 108 in FIG. 3. Therefore, in one implementation, the engine 242 first divides the canvas C into a number of N*>N squares and randomly selects a number of N centers $s_i^c$ of squares without drawback. Then, the global proposal engine 242 samples $x_s$ from the distribution $\Pi_i N(s_i; s_i^c, \sigma_{s_i}^2)$ e.g., where $\sigma_{s_i}^2$ is ⅙ the width of the square.

Orientation Proposal—Global View

The orientation $x_o$ is sampled based on the prior of orientation:

$$q(x_o) \alpha \prod_i N(o_i; 0, \sigma_o^2). \tag{12}$$

Layer Proposal—Global View

The layer index is sampled from its prior distribution as shown in Equation (9). Based on the conditional probability property $p(l_1, \ldots, l_N) = p(l_1)p(l_2, \ldots, l_N | l_1)$, the entire layer index can be sampled by sequentially sampling $l_1$ and $l_2, \ldots, l_N$. $p(l_1)$ can be easily proved to be a uniform distribution and as such can be directly sampled. In a similar way $l_2, \ldots, l_N$, with the condition of $l_1$, are sequentially sampled.

Exemplary Pairwise Proposal Engine

The acceptance rate of the global proposal is usually low compared with that of the local proposal. In order to make the Markov Chain have the ability to only partially jump away from a local minimum, a pairwise proposal is designed to meet this in-between goal. Thus, the pairwise proposal engine 244 achieves a proposal that is a compromise between the local proposal and the global proposal. In each iteration, the pairwise proposal engine 244 swaps the positions, orientations, or layer indices of (e.g., uniformly selected) two different images.

The pairwise proposal is particularly useful in the early and intermediate phases of the sampling.

Dynamic Weighting of the Multiple Optimization Proposals

The three weights $v_l$, $v_g$, and $v_p$ in Equation (10) represent an expectation of the frequencies of the local, global, and pairwise proposals being utilized. On one hand, when the local proposal cannot improve the result over a given time, the global and pairwise proposals should have larger probabilities of being utilized. So, the exemplary system can set $$v_l = \exp\left(-\frac{t^2}{2\sigma_t^2}\right),$$

where t is the number of iterations within which local proposal does not improve the result continuously, $\sigma_t$ controls the probability that the local proposal is utilized, and in one implementation is set to 6N so that the three types of local proposals have a good chance to be utilized. On the other hand, the pairwise proposal has the potential to partially jump away from a local minimum and find local detail. So it is desirable to encourage the pairwise proposal to have a higher probability of being utilized than the global proposal. Therefore, in one implementation, the system sets $v_p=3v_g$.

Exemplary Parallel Sampling

If a large number of images (N>32) are to be placed into the exemplary collage 108, then in one implementation the parallel sampling engine 246 partitions the canvas into several sub-canvases. Then, the parallel sampling engine 246 manages collage inference in parallel, on each sub-canvas. Afterwards, the sub-canvases are packed into the original large canvas. Two steps are sequentially performed to refine the collage: first, each sub-canvas is viewed as a single image and each is subject to local sampling; and second, local and pairwise samplings are run for the all images on the canvas.

Figure 7:
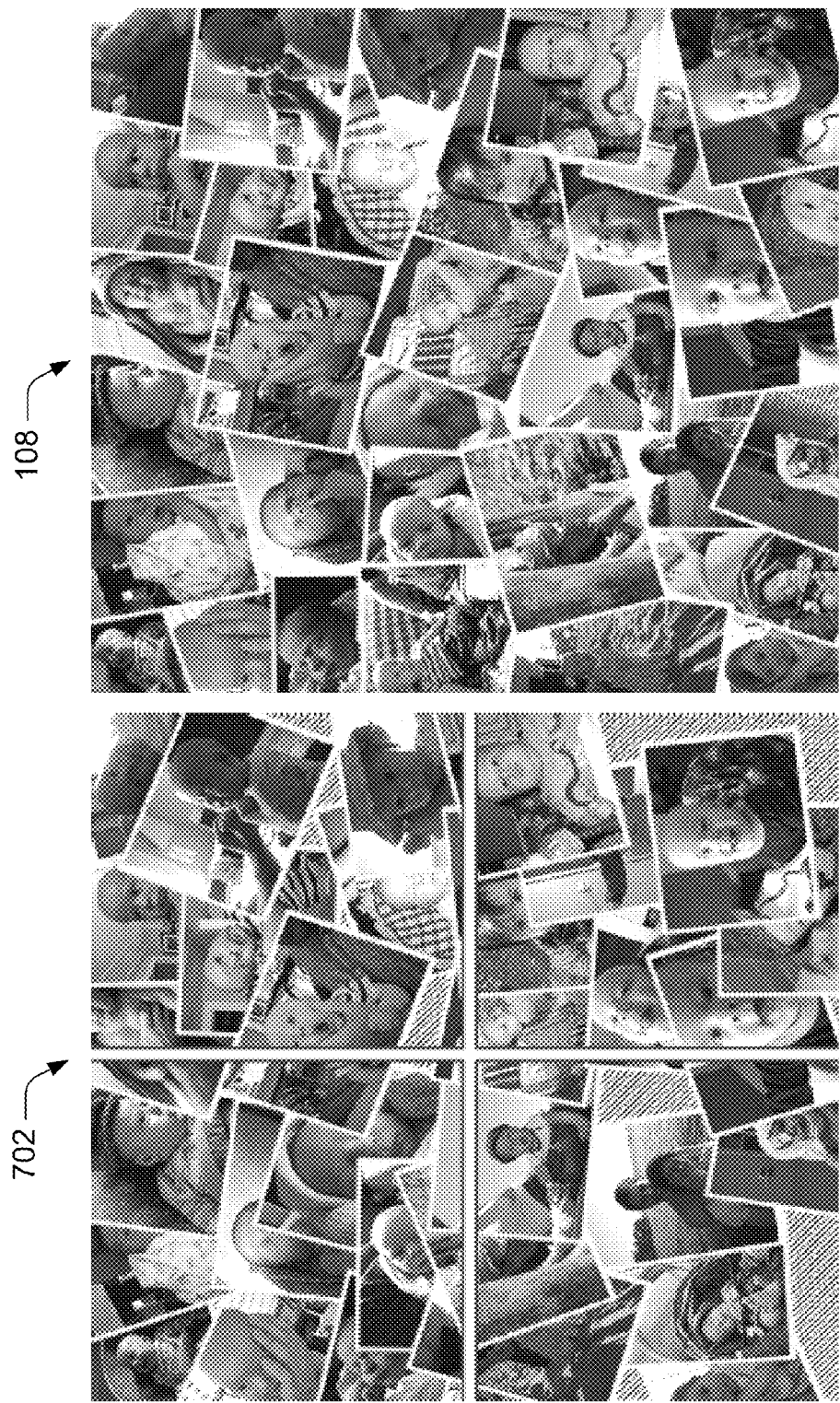
FIG. 7 is a diagram of exemplary sub-canvas partitioning.

FIG. 7 shows an example of the above-described parallel sampling. FIG. 7a is an exemplary collage 702 packed from four parallel collages associated with four partitioned sub-canvases, and FIG. 7b is the refined version of the same exemplary collage 108.

Exemplary Collage Creation

The exemplary collage engine 104 can create a visual image summary for photo collections and image search results 106. The fixed parameters suggested in the foregoing description can be used to create a collage having a square canvas with an area that is approximately half of the total area of all input images.

Figure 8:
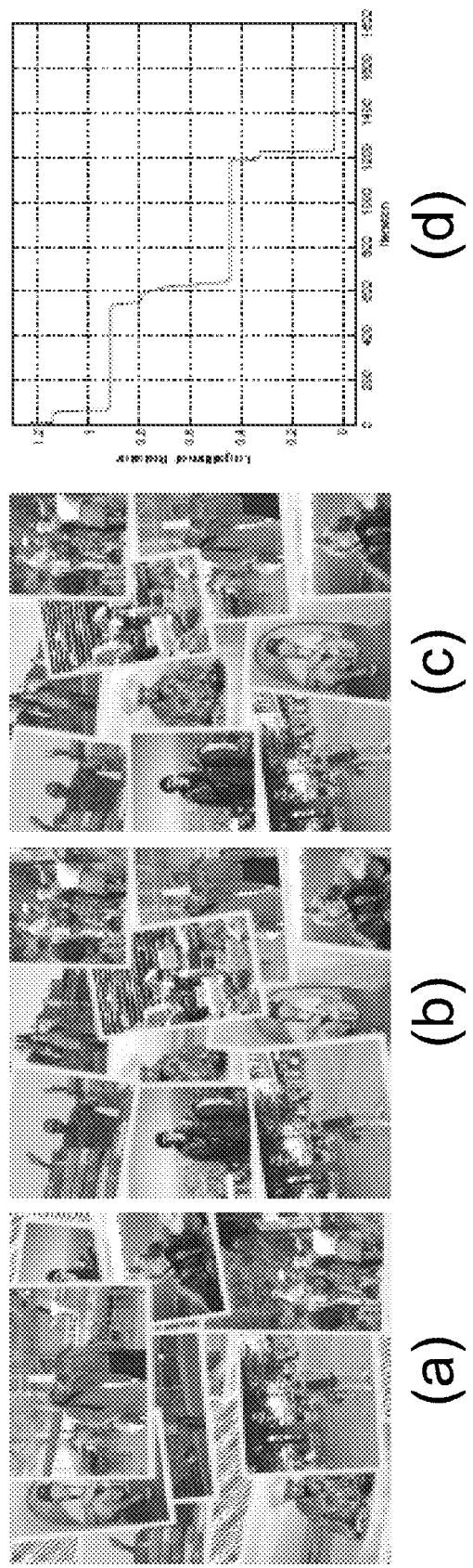
FIG. 8 is a diagram of processing energy used during exemplary picture collage creation.

FIG. 8 demonstrates the efficiency of the exemplary collage engine 104 and techniques. The changing curve of the energy (minus log of posterior) in FIG. 8d has plateaus that correspond to the collage evolution process. The example collage creating in FIG. 8 is performed on ten images. The parallel sampling engine 246 is not used in this example because there are only ten images to be included.

In the curve of FIG. 8d, the x-axis represents the iteration number, and the y-axis is the lowest energy up to the current iteration. From this curve, the lowest energy decreases quite rapidly around iterations 10, 600, and 1200. This phenomenon demonstrates that the distribution sampler 234 can jump away from a local minimum and hence effectively explore the vast space of the state variables distribution 236. In one implementation, an entire sampling process may only take eight seconds for the collage in FIG. 8, on a 2.8 GHz desktop PC.

Variations

In one application, the exemplary collage engine 104 can be used to summarize image search results. Links or pointers associated with each of the collaged images can be selected or "clicked" with a mouse to send the user to an original version of an image appearing in the collage, or to a website from which the image was obtained as a search result. Typical image search engines that use keywords usually return some undesirable images (e.g., figures, cartoons). So in one implementation, such extraneous images can be discarded through filtering.

Figure 9:
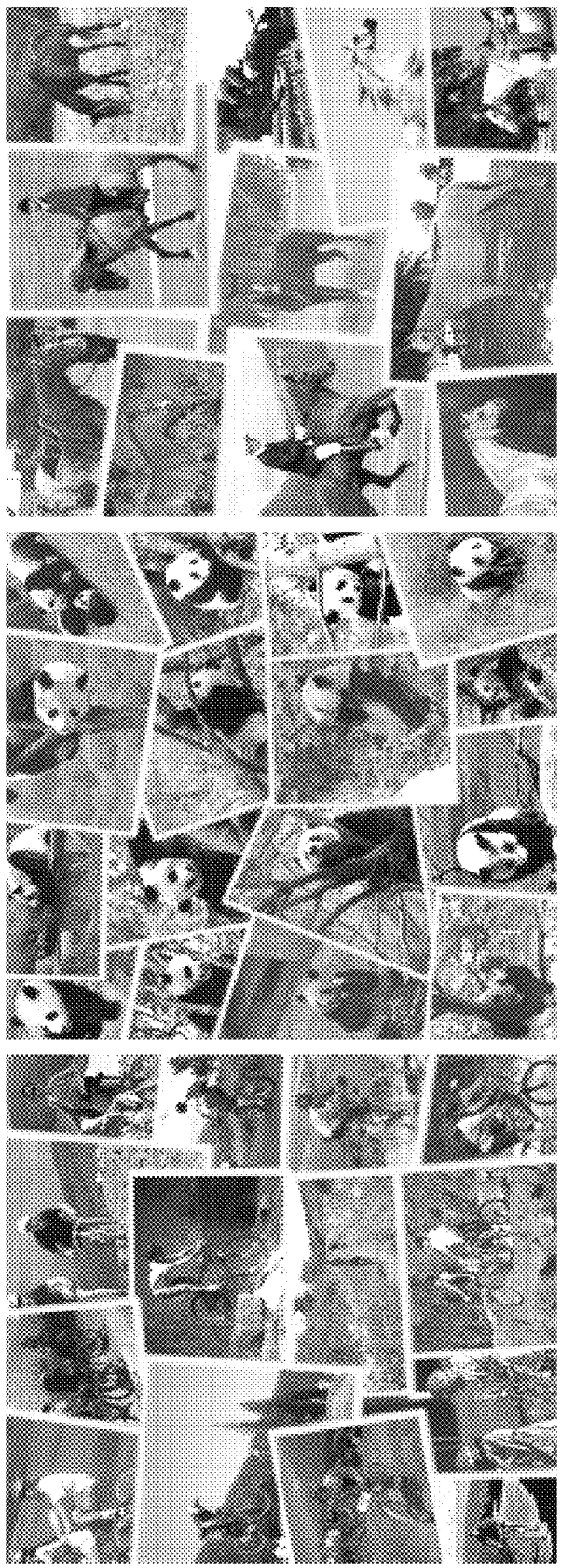
FIG. 9 is a diagram of Internet image search results compiled as an exemplary collage.

FIG. 9 shows three picture collages from image searches. Collages in FIGS. 9a and 9b are obtained using the parallel sampling engine 246 while the collage in FIG. 9c is not. Each collage can be obtained in 10-20 seconds.

As shown in FIG. 10, an exemplary collage derived from a larger number of images uses more processing resources. FIGS. 10a and 10b are picture collages from 32 images and 35 images, respectively. These results are obtainable using the parallel sampling engine 246 with four sub-canvases, e.g., typically in one or two minutes on a 2.8 GHz machine.

Exemplary Methods

Figure 11:
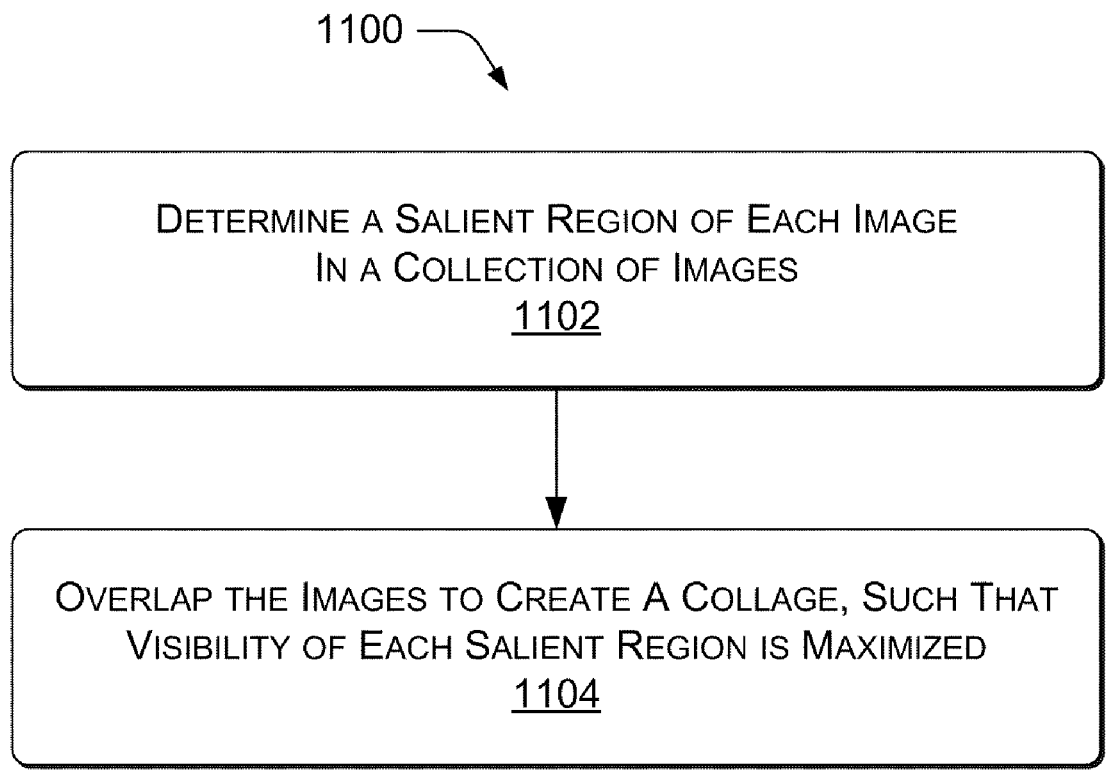
FIG. 11 is a flow diagram of an exemplary method of creating a picture collage.

FIG. 11 shows an exemplary method 1100 of automatically creating a picture collage. In the flow diagram, the operations are summarized in individual blocks. The exemplary method 1100 may be performed by hardware, or combinations of hardware, software, firmware, etc., for example, by components of the exemplary collage engine 104.

At block 1102, a salient region of each image in a collection of images is determined. In one implementation, the method extracts the largest salient region associated with each input image by adopting a visual attention model that combines multi-scale image features (e.g., color, texture, orientation) in a discriminative framework. A saliency map can be approximated by several weighted rectangles.

At block 1104, the images are automatically overlapped to create a collage, such that the visibility of each salient region is maximized. In one implementation, a maximization of the salient regions, together with other features, such as minimization of blank spaces in the collage, and balance of the amount of each salient region that can be shown across the images, are modeled in a Bayesian framework. A Markov Chain Monte Carlo technique optimizes the Bayesian model to obtain optimized state parameters designating where to position each digital image in the collage, how to apply rotational orientation to each image, and how to layer the overlap of images in the collage.

FIG. 12 shows an exemplary method 1200 of modeling parameters of a picture collage in a Bayesian framework in order to maximize desirable features. In the flow diagram, the operations are summarized in individual blocks. The exemplary method 1200 may be performed by hardware, or combinations of hardware, software, firmware, etc., for example, by components of the exemplary collage engine 104. FIG. 12 shows an exemplary method 1200 of modeling parameters of a picture collage in a Bayesian framework in order to maximize desirable features. In the flow diagram, the operations are summarized in individual blocks. The exemplary method 1200 may be performed by hardware, software, or combinations of hardware, software, firmware, etc., for example, by components of the exemplary collage engine 104.

At block 1202, collage parameters are arranged in a Bayesian framework, modeled for maximizing the visibility of image salient regions, minimizing blank spaces in the collage, and balancing the percentage of the salient regions that can be displayed.

At block 1204, the collage parameters are optimized by applying a Markov Chain Monte Carlo (MCMC) method to the Bayesian model. The MCMC optimization iterates proposed samples of the state variables for image position, rotational orientation, and layering to find instances of these variables that maximize the visibility of the salient regions, minimize blank spaces, and balance the visibility of the salient regions for all the images in the collage.

At block 1206, the MCMC optimization efficiently samples the state variables in a distribution by combining a first optimization proposal based on a local segment of the distribution, a second optimization proposal based on a global view of the variables distribution, and a third proposal that acts as a go-between to balance features of the first and second optimization proposals. This method of combining different views of the state variables distribution prevents the optimization from gravitating toward merely local minima in the distribution, while also preventing an excess expenditure of processing power if the optimization were to often process with a global view of the entire expanse of the state variables space.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-implemented method performed by a computing device that has one or more processors to execute instructions, the method comprising:
   determining a salient region of each image in a collection of images using a salient region extractor;
   modeling a salience visibility maximization of the salient regions, a blank space minimization of a canvas, and a salience visibility balance of the salient regions in a Bayesian framework to create a Bayesian model of a collage; and
   overlapping the images to create the collage, on the canvas based on the Bayesian model that maximizes a visibility of each salient region.

2. The method as recited in claim 1, wherein the size of the collage is bounded by a canvas size of a display.

3. The method as recited in claim 1, further comprising combining the collage with another collage that is created via parallel sampling.

4. The method as recited in claim 1, wherein the overlapping includes normalizing a percentage of the visibility of each salient region across the images.

5. The method as recited in claim 1, further comprising diversifying the rotational orientation of each image in the collage.

6. The method as recited in claim 1, wherein each of the overlapped images has state variables that include a 2-dimensional placement position for each image in the collage, a rotational orientation for each image, and a layering order for each image.

7. The method as recited in claim 1, further comprising optimizing the salience visibility maximization of the salient regions, the blank space minimization of the canvas, and the salience visibility balance of the salient regions modeled in the Bayesian framework by applying a Markov Chain Monte Carlo (MCMC) technique to the Bayesian model.

8. The method as recited in claim 7, wherein the optimizing provides optimized state variables including a 2-dimensional placement position for each image in the collage, a rotational orientation for each image, and a layering order for each image.

9. The method as recited in claim 8, further comprising placing each of the images on a display according to the optimized state variables achieved by the MCMC technique.

10. The method as recited in claim 8, wherein the MCMC technique optimizes the salience visibility maximization, the blank space minimization and the salience visibility balance of the Bayesian model by sampling combinations of the state variables from a distribution, wherein sampling the combinations of the state variables includes combining a first optimization proposal based on a local segment of the distribution, a second optimization proposal based globally on the distribution, and a third optimization proposal based on pairwise swaps of the state variables in the distribution that are associated with pairs of images.

11. The method as recited in claim 7, further comprising:
    partitioning the Bayesian model of the collage into partitions when a number of the images surpasses a threshold;
    for each partition, optimizing the salience visibility maximization, the blank space minimization, and the salience visibility balance by applying the MCMC technique to the Bayesian model with respect to each partition; and
    combining the partitions to create the collage.

12. The method as recited in claim 1, further comprising associating a pointer or a link with each image in the collage to link each image in the collage with a corresponding individual image or with a website from which the image was obtained.

13. An apparatus, comprising:
    a salient region extractor to determine a focus for each of multiple images;
    a Bayesian modeler to model a collage by overlapping the images while maximizing the foci by modeling a salience visibility maximization of salient regions in the multiple images, a blank space minimization of a canvas, and a salience visibility balance of the salient regions in the multiple images in a Bayesian framework to create a Bayesian model of the collage; and
    an image arrangement engine to arrange the multiple images on the canvas according to the Bayesian model to create the collage, each image in the collage having state variables.

14. The apparatus as recited in claim 13, further comprising an orientation diversifier to impart a rotational orientation from a range of rotational orientations to each image in the collage.

15. The apparatus as recited in claim 13, wherein the state variables corresponding to each of the multiple images includes 2-dimensional placement position for each image in the collage, a rotational orientation for each image, and a layering order for each image.

16. The apparatus as recited in claim 15, further comprising a Markov Chain Monte Carlo (MCMC) optimizer to optimize the parameters to achieve the salience visibility maximization, the blank space minimization, and the salience visibility balance of the collage.

17. The apparatus as recited in claim 16, further comprising a distribution sampler to obtain for the MCMC optimizer a combination of the state variables of the multiple images from a state variables distribution.

18. The apparatus as recited in claim 17, wherein the distribution sampler combines different types of proposals for the combination of the state variable from:
    a local proposal engine that proposes a first optimization proposal based on a local segment of the state variables distribution;

a global proposal engine that proposes a second optimization proposal based on based on a global segment of the distribution; and a pairwise proposal engine that proposes a third optimization proposal based on a compromise between the first optimization proposal and the second optimization proposal.

19. The apparatus as recited in claim 16, further comprising a parallel sampling engine for partitioning the images into groups for the MCMC optimizer when the number of image exceeds a threshold, wherein optimized groups are combined into the collage.

20. A system, comprising:
a salient region extractor to determine a salient region in each of multiple images;
a Bayesian modeler to model a salience visibility maximization of the salient regions, a blank space minimization of a canvas, and a salience visibility balance of the salient regions in a Bayesian framework to create a Bayesian model of a collage; and
an image arrangement engine to overlap the images on the canvas according to the Bayesian model to create the collage.

* * * * *